United States Patent [19]

Oikawa et al.

[11] Patent Number: 5,138,117
[45] Date of Patent: Aug. 11, 1992

[54] WATERTIGHT SEALING LIP FOR GROMMET

[75] Inventors: Ryuetsu Oikawa; Akihiko Fujita, both of Shizuoka, Japan

[73] Assignee: Yazaki Corporation, Tokyo, Japan

[21] Appl. No.: 736,900

[22] Filed: Jul. 29, 1991

Related U.S. Application Data

[63] Continuation of Ser. No. 201,158, Jun. 2, 1988, abandoned.

[30] Foreign Application Priority Data

Jul. 9, 1987 [JP] Japan .................. 62-104461[U]

[51] Int. Cl.⁵ .................. H01B 17/30; F16J 15/00; F16L 5/02
[52] U.S. Cl. .................. 174/152 G; 16/2; 174/153 G; 248/56; 277/178; 277/207 R; 277/208
[58] Field of Search .......... 277/178, 207 R, 207 A, 277/208, 4, 209, 210, 211; 174/152 G, 153 G; 285/188, 189; 16/2; 248/56

[56] References Cited

U.S. PATENT DOCUMENTS

| | | | |
|---|---|---|---|
| 3,081,102 | 3/1963 | Murray et al. | 277/208 X |
| 3,244,802 | 4/1966 | Sturtevant et al. | 16/2 X |
| 3,857,589 | 12/1974 | Oostenbrink | 277/207 A X |
| 4,429,886 | 2/1984 | Buttner | 277/207 A |
| 4,432,395 | 2/1984 | Beune et al. | 277/207 A X |
| 4,675,937 | 6/1987 | Mitomi | 16/2 |
| 4,839,937 | 6/1989 | Oikawa et al. | 16/2 |
| 4,928,349 | 5/1990 | Oikawa et al. | 16/2 |

FOREIGN PATENT DOCUMENTS

| | | | |
|---|---|---|---|
| 61-192423 | 12/1986 | Japan. | |
| 823722 | 11/1959 | United Kingdom | 174/153 G |
| 1116951 | 6/1968 | United Kingdom | 277/207 A |

Primary Examiner—Allan N. Shoap
Attorney, Agent, or Firm—Sughrue, Mion, Zinn, Macpeak & Seas

[57] ABSTRACT

A watertight sealing lip for a grommet is disclosed which tightly seals a gap between a wall of a panel or the like and an electric wire extending through a hole of the wall. The lip is annular and obliquely extends from an end of a cylindrical portion of the grommet toward the wall so that the tip of the lip comes into contact with said wall. An inside surface facing the wall is provided with a plurality of watertight sealing projections which extend in the circumferential direction of the lip and whose cross sections are sequentially enlarged from the tip of said lip toward the end of the cylindrical portion.

4 Claims, 2 Drawing Sheets

WATERTIGHT SEALING LIP FOR GROMMET

This is a Continuation of application Ser. No. 07/201,158, filed Jun. 2, 1988, now abandoned.

BACKGROUND OF THE INVENTION

The present device relates to a watertight sealing lip for enhancing the watertightness of a grommet by which the gap between a wall of a panel or the like and an electric wire extending through the hole of the wall is sealed in a watertight manner.

When the electric wire 1 of a motor vehicle or the like is inserted through a dashboard 2, a grommet is used to seal the gap between the electric wire and the dashboard, as shown in FIG. 1.

One example of a grommet is proposed in the Japanese Utility Model Application No. 192423/86 (filed on Dec. 16, 1986 and published on Jun. 28, 1988) which is assigned to the present assignee and which comprises a soft body A and a hard resin member B as shown in FIG. 2. The body A of the grommet comprises a tube 4 having a plurality of lips 3, which elastically pinch an electric wire 1 to seal it, an annular plate 5 extending continuously to the tube, and a cylindrical portion 6 extending continuously to the outer circumferential edge of the annular plate. An annular holding portion 7 extends inward from the end of the cylindrical portion 6. An annular watertight sealing lip 8 obliquely extends outward from the end of the cylindrical portion 6. An inner lip 9 curves from the end of the holding portion 7. The butt 10 of the hard resin member B of the grommet is fitted in an opening defined by the annular plate 5, the cylindrical portion 6 and the holding portion 7. An engaging portion 12 is provided at the end of a cylindrical portion 11 extending continuously to the butt 10 of the hard resin member B. Shown at 13 in FIG. 2 is a watertight sealing projection 13 provided on the watertight sealing lip 8. When the body A of the grommet is combined with the resin member B engaged on a wall 2 of a panel or the like, the tip of the watertight sealing lip 8, the watertight sealing projection 13 and the tip of the inner lip 9 are elastically deformed into tight contact with the wall 2, the wall can be sealed by the grommet body A of elasticity.

However, if there is a projecting piece such as foreign matter 14 on the surface of the wall 2 as shown in FIG. 3A, the projecting piece separates the watertight sealing projection 13 from the wall 2 creating an opening between the wall and the watertight sealing projection and keep the tip 8a of the watertight sealing lip 8 off the wall to let water come in.

Further, if the tip 8a of the watertight sealing lip 8 is defective at the time of the attachment of the grommet to the wall 2, as shown in FIG. 3B, the watertight sealing projection 13 is separated from the wall 2 to let water enter thereinto.

The present device is made in order to solve such problems.

According to the present device, a watertight sealing lip is provided for a grommet which tightly seals the gap between a wall of a panel or the like and an electric wire extending through the wall. The watertight sealing lip is annular and obliquely extends from the end of the cylindrical portion of the grommet toward the wall so that the tip of the lip comes into contact with the wall. The side of the watertight sealing lip, which faces the wall, is provided with a plurality of watertight sealing projections which extend in the circumferential direction of the lip and whose cross sections are sequentially enlarged from the tip of the lip toward the end of the cylindrical portion of the grommet.

The watertight sealing lip of a conventional grommet is more flexible at and near the tip of the lip than at and near the end of the cylindrical portion of the grommet according to the invention so that the lip is more easily deformed into tight contact with a wall or a projecting piece on the surface of the wall, at and near the tip of the lip than at and near the end of the cylindrical portion of the grommet. However, the pushing force of the watertight sealing lip to the wall is weaker in the vicinity of the end of the cylindrical portion of the grommet than in the vicinity of the tip of the lip so that the lip does not come into tight contact with the wall near the end of the cylindrical portion of the grommet.

The watertight sealing lip provided in accordance with the present device has the plurality of watertight sealing projections which are made sequentially larger in size toward an end of a cylindrical portion of the grommet to sequentially increase the pushing forces of the watertight sealing projections to the wall and are disposed so that the projection of larger size is located on the part of the watertight sealing lip, the quantity of elastic deformation of which is smaller. For that reason, at least one of the watertight sealing projections comes into tight contact with the wall. The reliability of the watertight sealing function of the grommet is thus made high.

BRIEF DESCRIPTION OF THE DRAWINGS

FIG. 1 shows a schematic view for describing the position of an electric wire extending through the panel of a motor vehicle or the like;

PREFERRED EMBODIMENTS OF THE INVENTION

Figure 1:
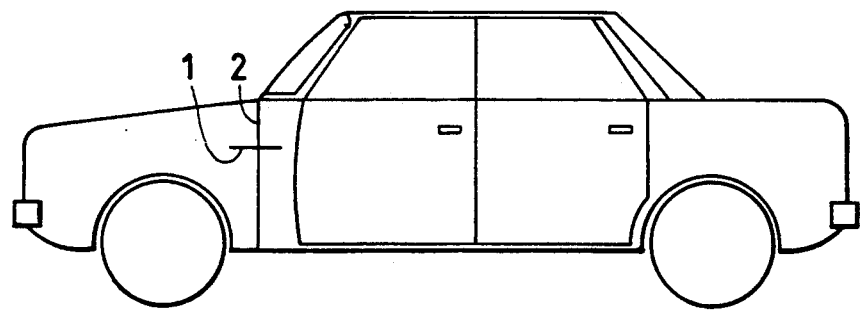
Figure 2:
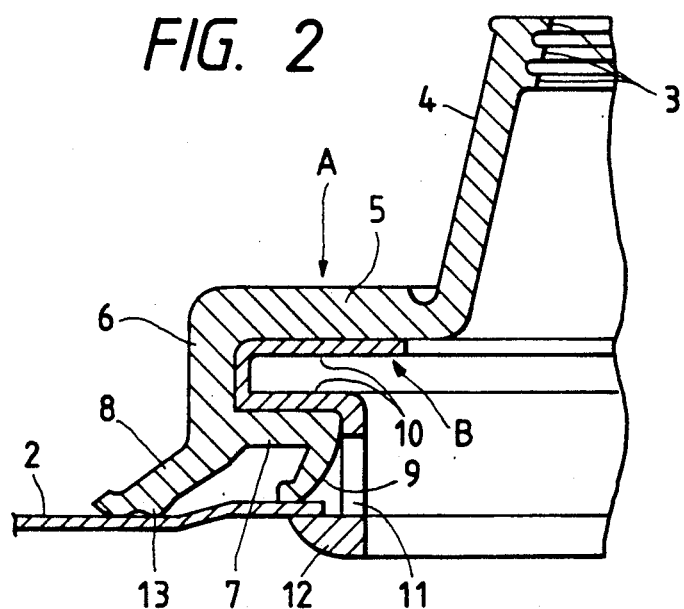
FIG. 2 shows a longitudinally sectional view of an example of a grommet.
Figure 3A:
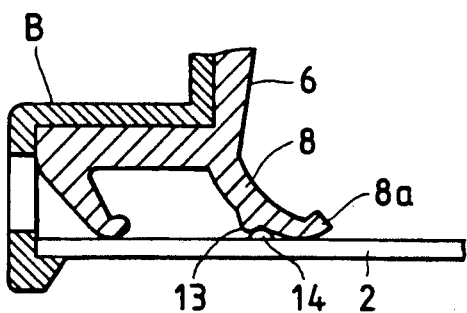
FIGS. 3A and 3B show sectional views for describing the contact of the watertight sealing projections of the grommet.
Figure 3B:
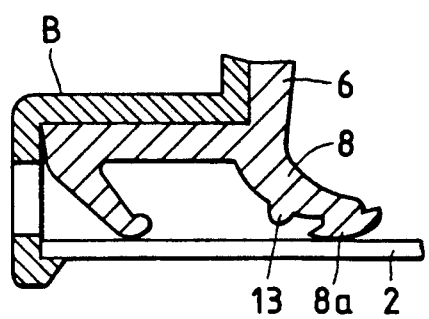

Embodiments of the present device are hereafter described with reference to the drawings attached hereto. The mutually corresponding portions shown in the drawings are denoted by the same reference symbols therein.

Figure 4:
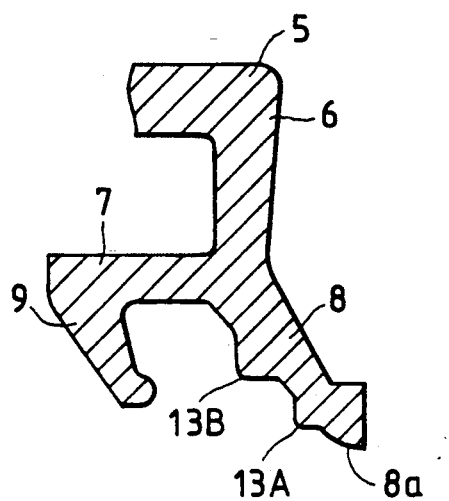
FIG. 4 shows a sectional view of a watertight sealing lip which is for a grommet and is an embodiment of the present device.
Figure 6A:
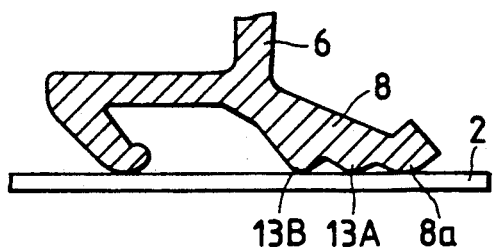
FIGS. 6A to 6C show sectional views for describing the contact of the watertight sealing projections and a wall.
Figure 6B:
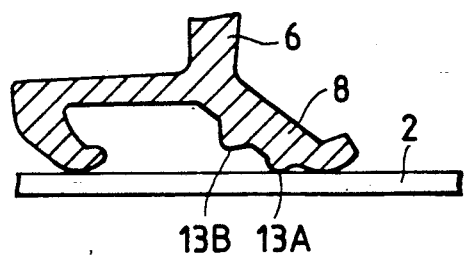
Figure 5:
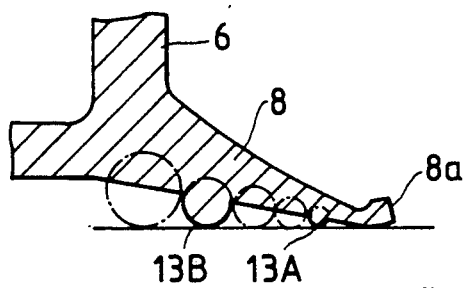
FIG. 5 shows a sectional view for describing the relationship between the size and position of the watertight sealing projections of the watertight sealing lip.
Figure 6C:
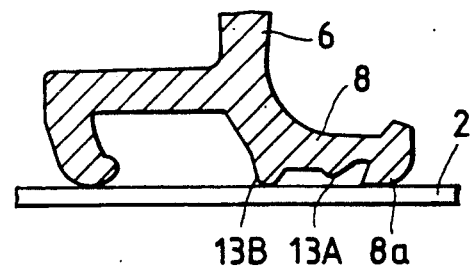

FIG. 4 shows an annular watertight sealing lip 8 which is one of the embodiments and provided with two watertight sealing projections 13A and 13B. As shown in FIGS. 6A to 6C, the watertight sealing lip 8 obliquely extends from the end of a cylindrical portion 6 toward a wall 2 so that the tip 8a of the watertight sealing lip comes into contact with the wall. The watertight sealing projections 13A and 13B are located on the side of the watertight sealing lip 8, which faces the wall 2. As shown in FIG. 5, the size of the watertight sealing projection 13B near the end of the cylindrical portion 6 is larger than that of the other watertight sealing projection 13A near the tip 8a of the watertight sealing lip 8. The size of each of the watertight sealing projections 13A and 13B is made inversely proportional to the distance between the watertight sealing projection and the cylindrical portion 6, as shown by one-dot chain lines in FIG. 5. Since the cross section of the watertight sealing projection 13B is made larger, the pushing force of the projection to the wall 2 is stronger. For that reason, even if the position of the wall 2 is changed or there is a projecting piece between the watertight sealing lip 8 and the wall, the pushing force of the lip to the wall is made strong enough to render the watertightness of the lip to the wall high.

The quantity of elastic deformation of the watertight sealing lip 8 increases toward the tip 8a thereof so that the watertightness of the lip to the wall 2 is high at or near the tip of the lip. On the contrary, the quantity of elastic deformation of the watertight sealing lip 8 decreases toward the cylindrical portion 6 so that the watertightness of the lip to the wall 2 is not high at and near the cylindrical portion. However, since the watertight sealing projection 13B of larger cross section is provided near the cylindrical portion 6, one of the watertight sealing projections 13A and 13B seals the wall 2 in a watertight manner if the other watertight sealing projection does not seal it in a watertight manner. FIG. 6A shows that the watertight sealing projections 13A and 13B are both in tight contact with the wall 2. FIG. 6B shows that the watertight sealing projection 13B is not in contact with the wall 2 but the other watertight sealing projection 13A is in tight contact therewith. FIG. 6C shows that the tip 8a of the watertight sealing lip 8 is involved on the wall 2 to keep the watertight sealing projection 13A off the wall but the other watertight sealing projection 13B is in tight contact with the wall to prevent water from coming in.

Figure 7:
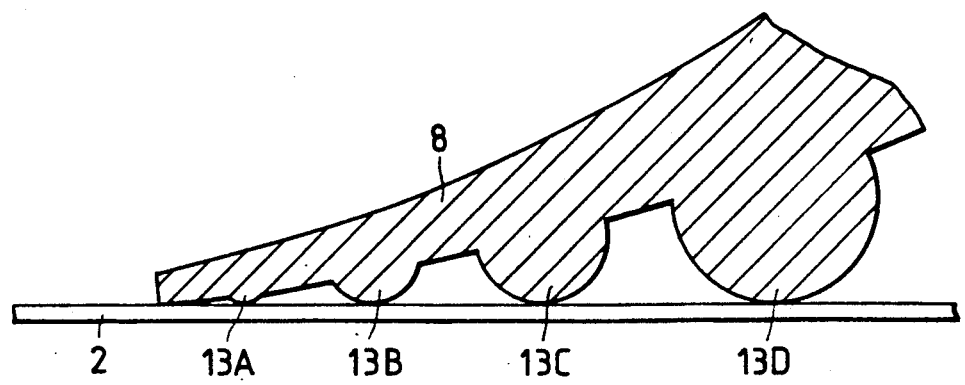
FIG. 7 shows a sectional view of a watertight sealing lip which is for a grommet and is another embodiment of the present device.

FIG. 7 shows a watertight sealing lip which is the other one of the embodiments and provided with watertight sealing projections 13A, 13B, 13C and 13D which function to seal a wall 2 in a watertight manner.

According to the present device, a watertight sealing lip is provided with a plurality of watertight sealing projections whose cross sections are sequentially enlarged toward the end of a cylindrical portion and which function to perform watertight sealing. The number of the sealing layers of a grommet is thus increased to enhance the reliability of the watertight sealing function thereof.

We claim:

1. A watertight sealing grommet for sealing a gap between a wall of a panel and an electric wire extending through a hole of said wall, comprising:
    a tubular portion for elastically securing said wire;
    an annular portion extending radially with respect to said tubular portion; and
    a first sealing means for sealing said panel, said first sealing means including an annular lip member obliquely extending from said annular portion and at least first and second circumferential projections each extending from said lip member toward said panel and contacting a face of the wall of said panel, said first circumferential projection being located inside said second circumferential projection, wherein said first circumferential projection is larger in size than said second circumferential projection.

2. The sealing device according to claim 1, wherein said first sealing means further includes one or more additional circumferential projections extending from said lip member, and each one, located inside, of the adjacent circumferential projections is larger in size than the other, located outside, of the adjacent circumferential projections.

3. The sealing device according to claim 1, further comprising a second sealing member for sealing said panel, said second sealing member is located inside of said first sealing means.

4. A watertight sealing grommet which tightly seals a gap between a wall of a panel and an electric wire extending through a hole of said wall, comprising:
    a tubular portion for elastically securing said wire;
    an annular portion extending radially with respect to said tube;
    a cylindrical portion axially extending from the outer circumferential edge of said annular portion; and
    a first sealing means for sealing said panel, said first sealing means including an annular lip portion obliquely extending from an end of said cylindrical portion toward said wall so that the tip of said lip comes into contact with said wall; an inside surface of said lip portion facing said wall being provided with a plurality of watertight sealing projections which extend in the circumferential direction of said lip whose cross sections are sequentially enlarged from the tip of said lip toward the end of said cylindrical portion.

* * * * *